United States Patent [19]
Csipkes et al.

[11] Patent Number: 5,855,503
[45] Date of Patent: Jan. 5, 1999

[54] FIBER OPTIC CONNECTOR WITH IMPROVED LOSS PERFORMANCE AND METHOD FOR FABRICATING SAME

[75] Inventors: Andrei Csipkes, Columbiaville, Md.; Felton Davis, Oakwood, Ga.; John Mark Palmquist, Lilburn, Ga.; Donald Q. Snyder, Marietta, Ga.

[73] Assignee: Lucent Technologies Inc., Murray Hill, N.J.

[21] Appl. No.: 810,115

[22] Filed: Feb. 25, 1997

[51] Int. Cl.[6] .................................................. B24B 11/00
[52] U.S. Cl. .................................. 451/41; 451/59; 451/63; 451/278
[58] Field of Search .............................. 451/41, 285, 287, 451/288, 59, 278, 63

[56] References Cited

U.S. PATENT DOCUMENTS

| | | | |
|---|---|---|---|
| 4,512,630 | 4/1985 | Runge | 350/96.21 |
| 5,185,966 | 2/1993 | Mock, Jr. et al. | 51/283 R |
| 5,458,528 | 10/1995 | Lurie et al. | 451/41 |
| 5,464,361 | 11/1995 | Suzuki et al. | 451/41 |
| 5,503,590 | 4/1996 | Saitoh et al. | 451/41 |
| 5,667,426 | 9/1997 | Minami et al. | 451/41 |

*Primary Examiner*—Eileen P. Morgan

[57] ABSTRACT

An improved fiber optic cable connector is provided that exhibits a consistent return loss rating of −60 dB or better. The connector comprises matable connector housings that terminate the ends of respective optical cables to be joined. Within each housing, the optical fiber of the respective cable is secured within a ceramic ferrule that extends axially of the connector. The endface of each optical fiber is exposed at the end of its respective ferrule. The ends of the ferrules are ground and polished in such a way that the endfaces of the optical fibers exhibit a planar undercut with respect to the lip of the axial passageway in which the fibers are secured. When the ferrules are brought and pressed together end-to-end as the connectors are mated, the material of each ferrule compresses until the endfaces of the optical fibers engage each other with near null pressure. The result is the near elimination of pressure on the optical fiber itself, which avoids a density and index of refraction change at the junction and thus improves return loss performance. A method of fabricating such a fiber optic cable connector is also provided.

24 Claims, 8 Drawing Sheets

FIBER OPTIC CONNECTOR WITH IMPROVED LOSS PERFORMANCE AND METHOD FOR FABRICATING SAME

TECHNICAL FIELD

The present invention relates generally to light waveguide communications cables, also known as fiber optic cables, and more particularly to connectors for joining the ends of two such cables together, wherein the ends of the joined cables are configured to provide improved light transmission and reduced reflected return loss across the junction. This invention also relates to a method of fabricating such improved connectors.

BACKGROUND OF THE INVENTION

Fiber optic cables are increasingly used in modem data and voice communications networks because of their small size and their ability to transmit a large volume of data and/or voice messages simultaneously. In any such network, a transmitted message may need to travel over a number of different connected fiber optic cables between the sender and the receiver of the message.

To accommodate the joining together of two fiber optic cables end to end in a communications network, a variety of cable connectors have been developed. One such connector is disclosed in U.S. Pat. No. 4,512,630 of P. K. Runge. In the Runge device, each of the optical cables to be joined is terminated in a plug having a truncated conical shape with a small diameter endface. The optical fiber of each of the cables is exposed on the endface of its respective plug. The cables are operatively joined together by being disposed in a bi-conical sleeve that holds the endfaces of the plugs together with the optical fibers aligned with each other.

Another fiber optic cable connector is AT&T's ST connector in which the end of each cable to be joined is terminated by a cylindrically shaped ceramic plug or ferrule having an axial passageway and a dome-shaped end. The optical fiber of each cable is secured within the passageway and extends along the axis of its respective ferrule and the endface of the fiber is exposed on the end of the ferrule. Traditionally, the ends of the ferrules are ground and polished until the endfaces of their respective optical fibers are smoothly polished and coplanar with or protrude slightly beyond the end of the ferrule. This configuration insures that, when the ends of two ferrules are brought together in the connector, the optical fibers align and contact each other so that light borne transmissions can cross from one fiber to the other.

Each ferrule in the ST connector is disposed in a respective cap and is yieldably biased to an outwardly protruding position by a compression spring in the cap. To connect the ends of two cables together, the caps are coupled to the opposite ends of a sleeve, which functions to align the ferrules axially and thus align the optical fibers exposed on the ends of the ferrules. As the caps are locked into the sleeve, the ferrule end and optical fiber endfaces engage and are depressed against the forces of their respective compression springs. The springs function to push and hold the ends of the ferrules, and thus the endfaces of the optical fibers, together with a predetermined force, which typically is the industry standard two (2) pounds. The ends of the optical fibers are thus aligned and held together face-to-face to facilitate the transfer of a light borne message from one of the cables to the cable joined thereto.

While the specific connectors described above are commonly used in the industry and are used as examples in the present disclosure, it will be understood that a variety of connectors and connector mechanisms are commercially available. Such connectors take various physical forms, are made of various materials, and operate mechanically in various ways. However, such connectors all perform the basic function of aligning and holding together the polished endfaces of two fiber optic cables so that light borne data can be transmitted from one cable to the other. In some instances, attenuators or other devices are disposed between the ends of the cables within a connector depending upon the purpose of the connection.

The transmission of a message across the junction between two joined fiber optic cables is not a perfectly efficient process. In each case, a small amount of the light that carries the message is reflected back from the junction so that the transferred signal is weakened slightly. This phenomenon is known as "return loss" and can result in a variety of problems that range from a reduction in transmitted signal integrity to destabilizing effects on the back detectors that monitor and control the solid state lasers that create and insert the laser signals into the network.

Return Loss is specified and measured in decibels (dB) and is calculated as follows:

$$\text{return loss} = -10 \log_{10} \frac{P_{reflected}}{P_{incident}}$$

Where $P_{reflected}$ is the optical power reflected at the junction between two mated connectors and $P_{incident}$ is the optical power that enters the junction between the two connectors. For example, if the incident power is $1 \times 10^{-3}$ watt and the flected power is $1 \times 10^{-8}$ watt, then the return loss is computed as follows:

$$\text{return loss} = -10 \log \frac{10^{-8}}{10^{-3}} = 50 \text{ dB}$$

A return loss of 50 dB, for example, means that the portion of the light reflected back from a junction of two fiber optic cables is attenuated 50 dB relative to the portion that is transferred across the junction. Thus, a connector with a greater dB return loss rating transfers more signal from one cable to another and reflects less back as return loss.

While fiber optic cable connectors have steadily been improved over the years to provide greater return loss ratings, commercially available connectors seem to have reached a practical limit of between 55 and 57 dB. Connectors with greater dB loss ratings have been produced in the laboratory under carefully controlled conditions. However, such conditions have not lent themselves to commercial production techniques. Thus, manufacturers have been unable to produce, with commercial consistency, fiber optic cable connectors with return loss ratings better than about 57 dB, even though a rating of at least 60 dB would be highly superior and even though return losses as high as about 75 dB are theoretically possible.

The causes of return loss at the junction between two joined fiber optic cables are many. Among the causes are microscopic imperfections on and just below the surfaces of the polished ends of the optical fibers. These imperfections can range from surface scratches to subsurface fractures caused by the grinding and polishing process itself Another cause of return loss arises from the fact that the ends of the joined optical fibers are pressed and held together within their connectors with a specified force, usually two (2) pounds. This force acts to compress the glass material of the fibers at their ends, creating an increasing molecular density gradient and thus an increasing optical index of refraction as light approaches the junction. The increased index of refraction in the region of the junction causes some of the light to be reflected back from the junction, resulting in return loss. Even though polishing techniques have improved, manufacturers have been unable to overcome these and other inherent causes of return loss and have thus been unable to produce fiber optic cable connectors with return loss ratings of 60 dB or greater in commercial quantities.

It should be noted that one type of known optical fiber connector, particularly, an angled physical contact (APC) connector, does routinely exhibit a return loss of greater than 60 dB. The APC connector has a beveled ferrule that is engaged and mated with a corresponding beveled ferrule of another APC connector. However, this type of connector is very difficult to produce and requires specialized manufacturing equipment, including specialized polishing equipment. Hence, for commercial mass production, the APC connector is not suitable.

Thus, there exists a need for an improved, commercially producible fiber optic cable connector that operatively joins the ends of two fiber optic cables together with a consistent return loss of at least 60 dB. Such a connector should be compatible with existing connectors and should be producible with little or no increased production costs as compared to current connectors. The 60 dB return loss rating should be stable over time and should not be affected by temperature cycles to which such connectors are sometimes subjected. It is to the provision of such a fiber optic connector that the present invention is primarily directed.

SUMMARY OF THE INVENTION

Briefly described, the present invention, in a preferred embodiment thereof, comprises a unique fiber optic cable connector assembly that couples two fiber optic cables together end-to-end for the transmission of a light borne signal from one cable to the other with a consistent return loss of 60 dB or greater. The assembly suffers no significant degradation in performance over a wide range of temperatures and pressures. Moreover, the invention can be implemented in any connector that utilizes a ferrule, for example but not limited to, ST, SC, D4, single zirconia material structure, angled physical contact (APC), etc.

The connector assembly comprises matable connector sections with each section terminating a respective end of one of the cables to be connected. Each connector section includes a plug that carries a cylindrical ceramic ferrule having a small axially extending passageway. The plug, and thus its ferrule, is biased outwardly by a suitably arranged compression spring. The end portion of an optical fiber is secured within the passageway of the ferrule by means of epoxy and the endface of the fiber is exposed at the end of the ferrule. To couple together two optical fibers terminated by such connector sections, the sections are joined and locked. This brings the ends of the two ferrules together with the endfaces of their respective optical fibers coaxially aligned with each other. As the connector sections are locked, the ferrule ends engage and press against one another and against the bias of their respective compression springs. In this way, the ends of the ferrules are pressed and held together by the compression springs. It is standard in the industry that each compression spring provides two (2) pounds of biasing force such that the ferrule ends are pressed together by a total of two (2) pounds of axial force. However, spring constants other than the standard are possible.

As described in some detail in U.S. Pat. No. 5,185,966, the ends of the ferrules, and thus the endfaces of the optical fibers exposed thereon, are carefully prepared by being ground and polished until they exhibit a predetermined smoothness and physical configuration. While a variety of polishing methods and apparatus are available, it is common for the ends of the fiber bearing ferrules to be held against a moving polishing surface having a backing of predetermined resilience. Successively finer polishing media are used in successive polishing steps until the end of the ferrule and endface of the fiber have taken on the desired configuration and polish. In practice, it is desired that the polished end of the ferrule be slightly dome-shaped with the endface of the exposed optical fiber being located at the apex of the dome. The resiliency of the backing material of the polishing surface determines in large measure the radius of such dome. A dome shape having about a nineteen (19) millimeter spherical radius is standard in the industry. However, dome shapes of spherical radii other than nineteen millimeters may also be used.

When polishing ferrule ends, the difference in density and hardness between the ceramic material of the ferrule and the extremely pure glass of the optical fiber itself causes the end of the ferrule to abrade away at a rate different than the endface of the optical fiber. This provides a method of controlling the final spatial relationship between the surface of the ferrule end and the surface of the optical fiber endface. Such spatial relationship is commonly described in terms of spherical undercut and planar protrusion. Spherical undercut refers to the axial distance between the surface of the optical fiber endface and the apex of the dome defined by the surface of the surrounding ferrule end. Planar protrusion refers to the axial distance between the surface of the optical fiber endface and the lip of the ferrule passageway in which the optical fiber is secured. It has long been believed optimal that a ferrule end be polished until the endface of its optical fiber is at least coextensive with the end of the ferrule and preferably protrudes slightly therefrom. In this way, it is believed, the optical fibers themselves contact each other first when two cables are joined and a better interface is achieved. Ferrule ends have long been produced according to this belief. One long standing industry standard configuration has been a ferrule end with a nineteen (19) millimeter spherical radius dome shape and wherein the endface of the optical fiber defines about a fifty (50) nanometer spherical undercut and about a one hundred (100) nanometer planar protrusion. As discussed above, connectors utilizing such a configuration have not been capable of providing return loss ratings above about 55 to 57 dB.

The inventors have discovered that, contrary to long held conventional wisdom, ferrule ends wherein the optical fibers exhibit a slight planar protrusion are not optimal but, in fact, are one of the sources of the apparent practical return loss limit heretofore observed. It is believed that such limit results, at least in part, from the compression of the optical fiber ends together, causing a density and index of refraction gradient in the region of the junction.

In the present invention, an optical cable connector is provided wherein the endface of the optical fiber exhibits not only a spherical undercut, but also a planar undercut relative to the surface of the surrounding ferrule end. That is, the endface of the optical fiber is actually recessed below the lip of the ferrule passageway in which the fiber is secured. In the preferred embodiment, wherein the ferrule end is polished to a dome shape of nineteen (19) millimeter spherical radius, it has been found that an optical fiber endface that exhibits a spherical undercut of between about two hundred (200) nanometers and about two hundred twenty-five (225) nanometers provides consistent return loss performance of at least 60 dB. This configuration corresponds to a planar undercut of about 75 nanometers. In other words, the endface of the optical fiber is actually recessed about 75 nanometers within its ferrule passageway. It is believed that such a configuration provides superior results because, as the ferrule ends are brought and pressed together with the industry standard two (2) pounds of force, the ceramic material of the ferrule compresses around the lip of its central opening until the optical fiber endfaces just contact each other with near null pressure. In this way, the optical fibers themselves do not bear the force provided by the compression springs and the glass of the fibers is not compressed by such force. Instead, almost all of such force is borne by the ceramic ferrule material and the fiber endfaces engage each other with near null pressure. As a result, the density and thus the index of refraction of the glass material remains substantially unchanged in the region of the junction. Since light does not encounter an index of refraction gradient as it approaches the junction, reflection from this region and thus return loss is reduced significantly. The ultimate practical result is that connectors made in accordance with the present invention consistently exhibit return loss ratings of 60 dB or greater.

The present invention also includes a method of configuring and finishing ferrule ends to produce the unique recessed or undercut relationship between the optical fiber endface and the end of the ferrule. In the preferred embodiment, the method comprises the steps of stripping the end portion of a fiber optic cable to expose the optical fiber and inserting the optical fiber through the central passageway of a ceramic ferrule until the free end of the fiber protrudes from the end of the ferrule. The optical fiber is then secured within the passageway with an appropriate epoxy and the protruding free end is cleaved. The ferrule is then secured in a polishing apparatus for a succession of grinding and polishing steps. In the first step, the excess fiber and epoxy are removed from the ferrule end with a coarse abrasive. Next, a medium abrasive is used to remove deep scratches and to contour the ferrule end until it takes on a domed shape that is preferably of approximately 19 mm. spherical radius. A medium fine abrasive is then used to successively remove the deeper scratches. At this stage, the endface of the optical fiber still protrudes from the end of the ferrule. In the final polishing step, the end of the ferrule is polished with a fine abrasive until the center of the fiber endface of the optical fiber exhibits a spherical undercut of between 200 nm and 225 nm with respect to the end of the ferrule. This corresponds to about a 100 nm planar undercut with an 19 mm. spherical radius domed ferrule end. That is, the endface of the optical fiber is recessed about 100 nm within the central passageway of the ferrule. With a zirconia ferrule and a 0.05 micron silicon dioxide slurry abrasive, this final polishing step has been found to require about 4 minutes and 12 seconds of polishing time.

Thus, a fiber optic cable connector and fabricating method is now provided that addresses the problems of the prior art and that consistently achieves the heretofore elusive goal of providing a return loss rating of 60 dB or better. Although the connector is not fully compatible with all current industry standards, it is matable to connector configurations with industry standard parameters. It has been found that the connector of the present invention can be coupled to a standard prior art connector with return loss performance the same as or slightly better than that achieved using two prior art connectors. Thus, the connector of this invention is immediately integratable into existing fiber optic cable networks. Further, the method of fabricating the connector is fully compatible with existing ferrule end polishing machines and requires no modifications of such machinery.

These and other features and advantages will become more apparent upon review of the detailed description set forth below taken in conjunction with the accompanying drawings, which are briefly described as follows.

BRIEF DESCRIPTION OF THE DRAWINGS

The present invention can be better understood with reference to the following drawings. The drawings are not necessarily to scale, emphasis instead being placed upon clearly illustrating principles of the invention.

DETAILED DESCRIPTION OF THE PREFERRED EMBODIMENT

Figure 1:
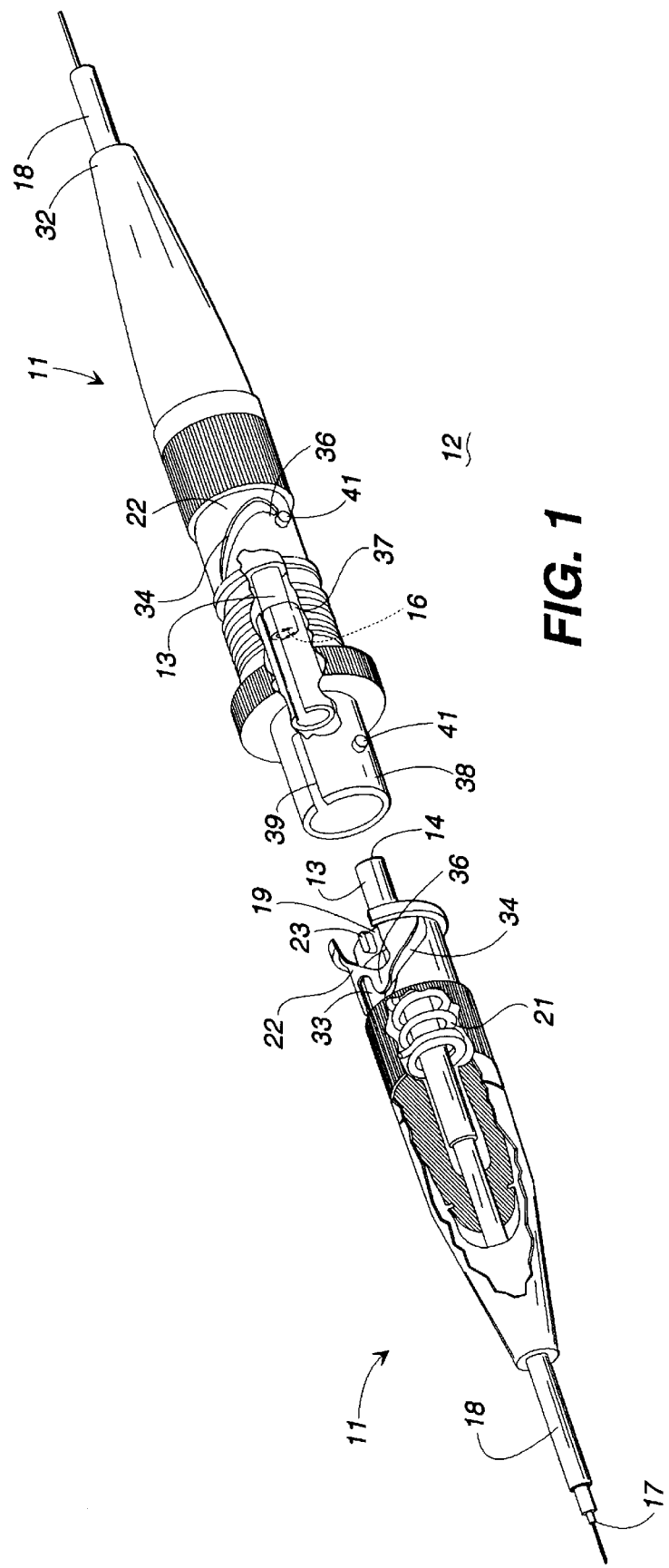
FIG. 1 is a perspective partially cut-away view of a fiber optic cable connector assembly illustrating the major functional elements thereof
Figure 2:
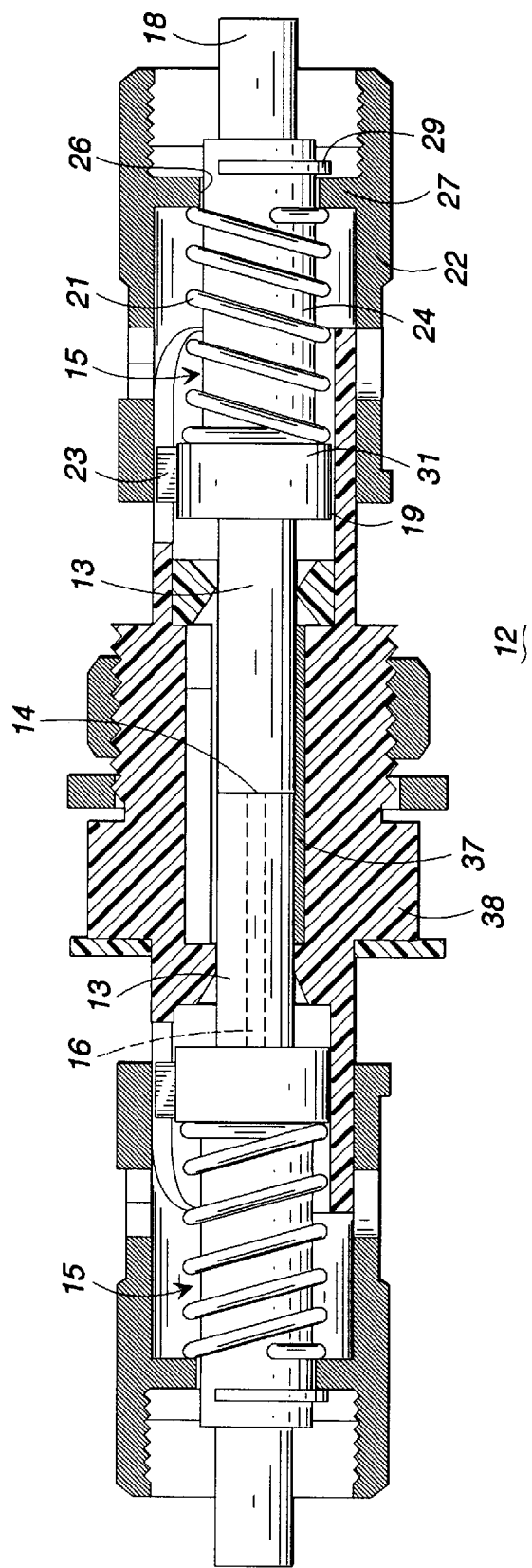
FIG. 2 is a partially cross-sectional view of the connector assembly of FIG. 1 shown in its connected configuration for coupling together two fiber optic cables.

Referring now in more detail to the drawings, in which like reference numerals refer to like parts throughout the several views, FIGS. 1 and 2 illustrate a fiber optic cable connector arrangement that embodies principals of the present invention in a preferred form. While the physical appearance and operation of the connectors shown in FIGS. 1 and 2 represent an industry standard configuration, it should be understood that the present invention is not limited to any particular connector shape or mechanical operation. The particular connector configuration of FIG. 1 and 2 has been selected for clarity of illustration because it is a common connector design.

The connector arrangement 12 comprises a pair of connectors 11—11, each of which terminates a respective optical fiber cable 18. Each connector 11 has an outer housing that carries an internal generally cylindrical plunger or plug assembly 15 (FIG. 2). Secured within and protruding axially from the plug assembly 15 is a cylindrically shaped ferrule 13 having an axial passageway 16 (see FIG. 2) and being made of a glass or ceramic material such as, for example, zirconia. In the preferred embodiment, the ferrule 13 has an outer diameter of about 2500 microns and terminates in an end 14, which includes an opening of the passageway 16.

In terminating a cable 18, an uncoated end portion of the optical fiber 17 is inserted into the passageway 16 of each ferrule 13. The end portion of the optical fiber is secured within the passageway 16 of the ferrule 13 by means of an appropriate epoxy with a tip of the optical fiber protruding from the end of the ferrule. Then, the endface of the optical fiber is cleaved and polished, which results in a portion of the optical fiber remaining protruded from the end of the ferrule.

Each termination also includes a connector body 19 (see FIGS. 1 and 2) made of a plastic or metallic material, a compression spring 21, and a tubular cap 22 made of plastic or a metallic material. It should be observed that the ferrule 13, the connector body 19, and the cap 22 each has a cylindrical cross section in the preferred embodiment. The connector body 19 includes a separate orienting or alignment key 23, which projects radially from the longitudinal axis and which can be attached to the connector body at any of a plurality of positions.

The connector body 19 includes a small diameter portion 24 (see FIG. 2), which extends through an opening 26 in an internally disposed collar 27 in the cap 22. A retaining washer 29 circumscribes the small diameter portion of the outer side of the collar. The spring 21 is disposed about the smaller diameter portion 24 of the connector body 19 between the collar and a large diameter portion 31. As a result of this arrangement, the spring 21 yieldably biases the plug assembly 15, and the ferrule 13 outwardly from the connector body. A tapered cable spring release portion 32 (see FIG. 1) may be secured threadably to the cap 22.

Referring again to FIG. 1, it can be seen that each cap 22 includes a longitudinally extending slot 33, which at one end communicates with a circumferentially extending slot 34. The slot 34 is formed so that the tubular wall of the housing that defines it includes a latching projection 36. These slots 33 and 34 are used for securing a termination to another portion of a connection system.

For connection of two connectors 11—11, each ferrule 13 thereof is inserted into an end of a split sleeve 37 disposed in a housing 38. Each end of the housing 38 includes a slot 39 and two diametrically opposed pins 41—41. As each plug is inserted into the sleeve, the key 23 of the plug is moved into a slot 39 and each pin 41 is moved into a slot 34, and eventually into a latching slot 33.

With the just-described connector arrangement, it will be seen that when the connectors 11—11 are coupled and locked together, the ends 14 of the ferrules 13 align with and engage one another. The force of engagement between the ends of the ferrules pushes the ferrules and their plug assemblies 15 back into their respective connectors against the bias of compression springs 21. In this way, the ends of the ferrules are pressed together by the compression springs with a force that is determined by the spring constant of the springs. As discussed above, it is standard within the industry that each of the springs is selected to provide a force of about two (2) pounds. With this arrangement, the endfaces of the optical fibers secured within their respective ferrules are aligned with each other so that light borne signals can travel from one of the optical fibers across the junction to the other fiber.

Figure 3:
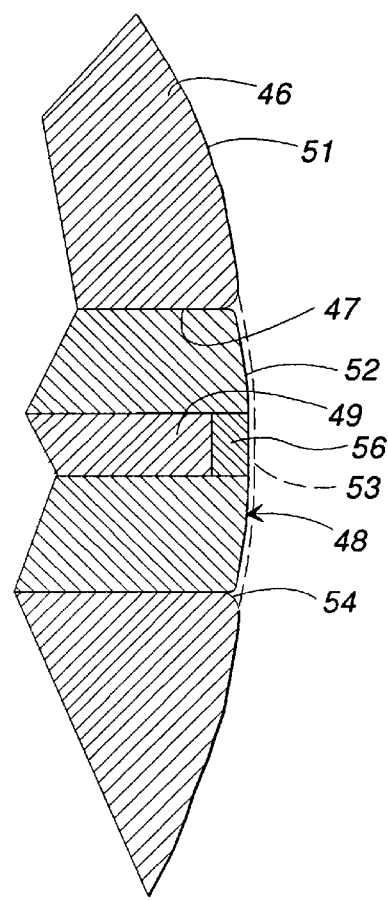
FIG. 3 is a cross-sectional view of the polished end of a typical prior art ferrule with curvatures exaggerated to illustrate the relationship between the domed ferrule surface and the endface of the optical fiber.

FIG. 3 is a cross sectional illustration showing the configuration of a typical prior art ferrule end. It should be noted that in FIG. 3, as well as in FIGS. 4 through 6, the curvatures of the ferrule end and the optical fiber endface have been exaggerated for purposes of illustration and discussion. Referring to FIG. 3, a typical prior art connector includes a ferrule 46 that preferably is formed of a glass or ceramic material, such as zirconia. The ferrule 46 is formed with an axially extending passageway 47 within which is secured an optical fiber 48. The optical fiber 48 is secured within the passageway 47 by means of an appropriate epoxy and has a central core 49 that actually carries the light borne transmission signals.

In preparing a ferrule and its optical fiber for use, the optical fiber 48 is secured within the passageway 47 by means of the epoxy. Initially, the optical fiber 48 extends beyond the end of the ferrule. During the preparation process, the fiber 48 is cleaved down to a position close to the end of the ferrule. The end 51 of the ferrule and the endface 52 of the optical fiber is then abraded and polished. The abrasion and polishing process can be achieved in a variety of ways such as, for example, with a rotating disc-type polishing apparatus such as that shown in U.S. Pat. No. 5,107,627. In such devices, the end of the ferrule is held against a moving abrasive surface, which slowly abrades away the material of the ferrule and the endface of the optical fiber. The polishing process is carried out in stages with progressively finer abrasives applied at each stage until the desired configuration is achieved. In this regard, it has been found desirable that the finished polished end 51 of the ferrule exhibit a domed configuration with the apex of the dome coinciding with the axis of the ferrule. Likewise, it is desirable that the endface 52 of the optical fiber 48 have a slightly domed configuration as well. Such a domed configuration is achieved by selecting an appropriately resilient backing material for the abrasive discs used in the polishing process.

In prior art connectors, the ferrule ends have been ground and polished until the endfaces 52 of their respective optical fibers 48 bear a specific spatial relationship to the end 51 of the ferrule. More specifically, the polishing process has been carefully controlled to produce a ferrule end wherein the endface 52 of the optical fiber exhibits a predetermined spherical undercut and a predetermined planar protrusion with respect to the end 51 of the ferrule. The term "spherical undercut" refers to the distance between the highest point of the endface of the optical fiber 48 and the apex 53 of the dome defined by the end surface of the ferrule end 51. The term "planar protrusion" refers to the distance that the optical fiber 48 protrudes beyond the lip 54 of the passageway 47 formed in the ferrule 46. As discussed above, it has long been a common belief in the telecommunications industry that a planar protrusion of the optical fiber be provided so that, when two ferrules are brought together end-to-end in a connector, the centers of the optical fibers are the first things to engage, thereby, it was thought, providing maximum transmission of light across the junction.

When the ends of fiber bearing ferrules are polished as described above, the end of the optical fiber core 49 exhibits a surface roughness zone 56 that extends from the endface of the fiber a predetermined distance into the glass material of the core. It has been found that this zone is actually a region of slightly decreased density and that the width of this region can be controlled somewhat during the polishing process.

By way of specific example of the foregoing configuration, a common production fiber optic cable connector of the prior art is formed with the configuration as set forth hereinafter in Table A.

TABLE A

| PARAMETER | VALUE |
| --- | --- |
| Ferrule Dome Radius | 19 mm. spherical |
| Spherical Undercut | 50 nm |
| Planar Protrusion | 100 nm |
| Width of Surface Roughness Zone | 5 nm |

The undercut/protrusion parameters can be measured with any suitable measurement system. The undercut/protrusion values that are set forth herein were measured using an automatic inspection system as described in commonly assigned co-pending application entitled "Automatic Inspection System and Method for Contactlessly Measuring the Disparity Between Two Surfaces", filed Apr. 27, 1995 and assigned Ser. No. 08/429,999. Another example of a system that may be employed to measure these parameters is a WYKO Topological Measurement System, which is manufactured by and commercially available from WYKO, Inc., U.S.A. However, the latter system may generate slightly different undercut/protrusion values than those set forth herein due to differences in design.

With this common prior art configuration, fiber optic cable connectors have been able to achieve return loss ratings as high as about 55 to 57 dB; however, consistent return loss performance better than this has not been attained.

Figure 4:
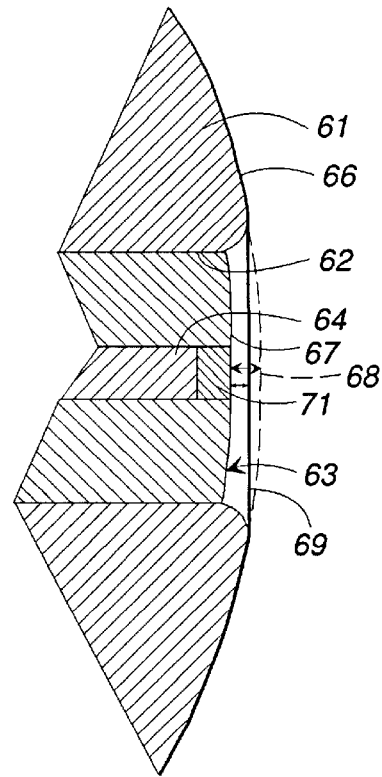
FIG. 4 is a cross-sectional view of the polished end of a ferrule formed according to the present invention with curvatures exaggerated to illustrate the relationship between the domed ferrule surface and the endface of the optical fiber.

FIG. 4 illustrates the end portion of a fiber bearing ferrule 61 that embodies principles of the present invention. As with the prior art, the ferrule 61 is formed of an appropriate glass or ceramic material and has a central passageway 62 within which an optical fiber 63 is secured by an appropriate epoxy or other suitable bonding material. The optical fiber 63 has a core 64 that actually carries the light borne transmissions. The end surface 66 of the ferrule is polished to define a dome shape with a predetermined spherical radius. Unlike the prior art, the present invention exhibits a spherical undercut, indicated by the longer arrow at the tip of the optical fiber, but does not exhibit a planar protrusion. In the present invention, the endface of the optical fiber 63 is actually recessed below the lip 69 of the ferrule passageway 62 to define a planar undercut, indicated by the shorter arrow at the tip of the core 63. Also, unlike the prior art, the surface roughness zone or zone of the decreased density 71 has a width that is substantially greater than such a zone in the prior art.

Extensive empirical experimentation has demonstrated that the configuration in Table B hereafter represents an optimal configuration of a ferrule end that, when implemented, provides consistent return loss ratings of 60 dB and better. This configuration is optimized for a ferrule made of zirconia and for a compression force of two (2) pounds, both of which are industry standards.

TABLE B

| PARAMETER | VALUE |
| --- | --- |
| Ferrule End Dome Radius | 19 mm. spherical |
| Spherical Undercut | 200–225 nm |
| Planar Undercut | 50–75 nm |
| Width of Surface Roughness Zone | 20 nm |
| Fiber Endface Radius | 18 mm. spherical |

Figure 5:
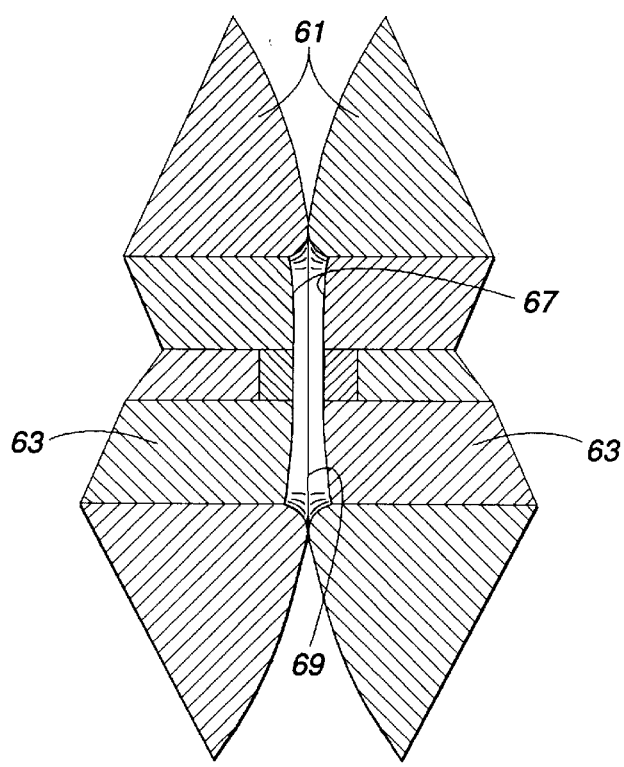
FIG. 5 is a cross-sectional view showing two ferrule ends of the present invention as they appear upon contact within a fiber optic cable connector.
Figure 6:
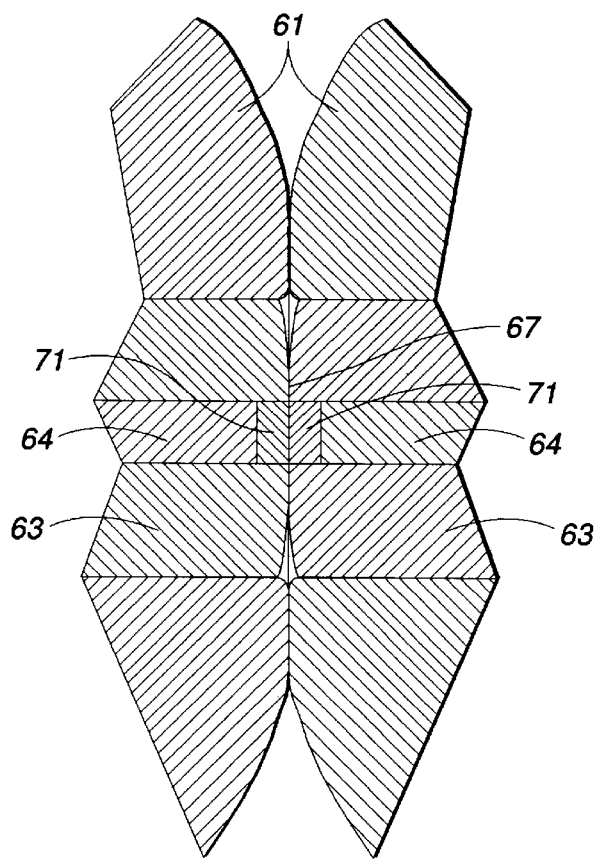
FIG. 6 is a cross-sectional view illustrating how the ferrule material is compressed to bring the ends of the optical fibers together with near null pressure when the ferrules are pressed together with a predetermined force.

FIGS. 5 and 6 illustrate graphically the bringing together within a connector assembly of the ends of two fiber bearing ferrules configured according to the present invention. In FIG. 5, the ferrule ends are shown just as they engage each other within the connector assembly. FIG. 6 illustrates the configuration of the ferrule ends when they are pressed together within the connector assembly by their respective compression springs with a predetermined force, preferably the industry standard two (2) pounds. In FIG. 5, the lips 69 of the ferrules 61 have just engaged each other. Since the endfaces 67 of the fibers 63 are recessed below the lips 69 of their respective ferrule passageways, an airspace is initially defined between the endfaces 67 of the fibers when the ferrule ends engage as shown in FIG. 5.

As the respective connectors are coupled and locked together, their compression springs press the ends of the fiber bearing ferrules together with the two (2) pound force. As illustrated in FIG. 6, this force causes the ceramic material of the ferrules 61 to compress and deform in a region surrounding the lips of their passageways. This, in turn, brings the endfaces of the optical fibers together until they just engage each other with near null pressure. Thus, the force provided by the compression springs is borne by the ferrules surrounding the optical fibers and not the optical fibers themselves. Accordingly, the optical fibers are not compressed at their ends and the density and index of refraction gradient present in prior art configurations is virtually eliminated.

In addition, it has been found that the depth of the surface roughness zone 71 also impacts the performance of the connectors. While the inventors do not know precisely why this is true, it is thought that the zones of reduced density 71 provide for a more transparent interface of the fiber cores 64 at their junctions. In addition, it is thought possible that the regions of slightly reduced density may be compressed just slightly under the near null force holding the fibers together to provide a density and thus an index of refraction in these zones that is the same as or very close to that in the remainder of the core 64. Whatever the mechanism, however, the inventors have discovered that these zones of decreased density appear to play a role in the increased performance of the present invention.

Figure 7:
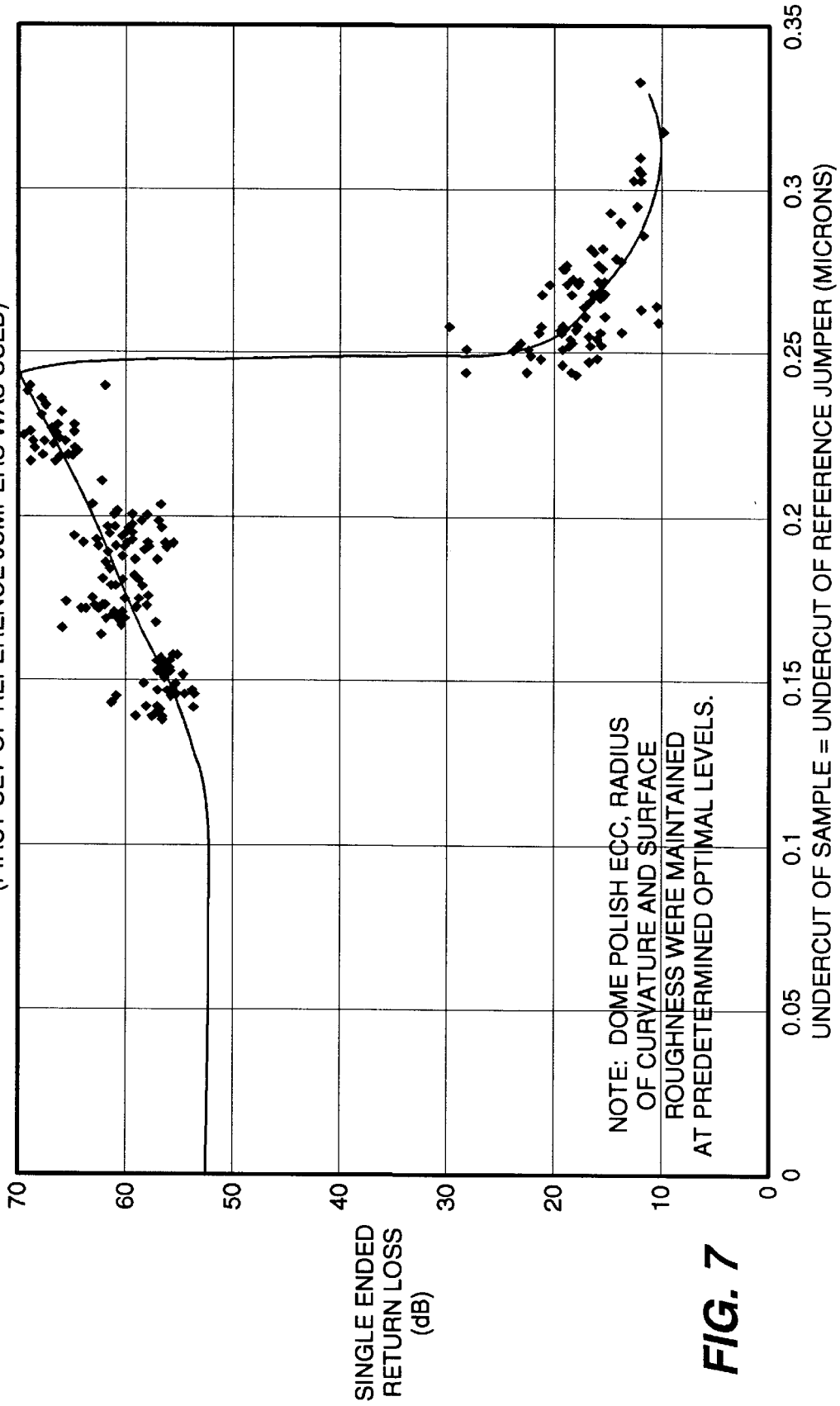
FIG. 7 is a graph of return loss versus undercut.

For a ferrule end polished to have an industry standard 19 mm spherical radius dome shape, it has been found that a spherical undercut of between 200 nm and 255 nm, preferably 212 nm, and a reduced density zone having a thickness of between 18 and 22 nm, and preferably 20 nm provides the unique property of this invention of exhibiting consistent return loss of 60 dB or better. FIG. 7 is a graph of return loss versus spherical undercut showing test data that supports the foregoing conclusions. However, the specific values of spherical undercut, planar undercut, and low density zone thickness will vary as a function of the radius of curvature of the ferrule ends, the material of the ferrule, and the force with which the ferrule ends are held together. The important structural requirements are that, for a ferrule end of a given spherical radius and for a given force with which the ends are to be held together, a planar undercut is selected such that when the ferrule ends are pressed together by the preselected force, the material of the ferrules compress in an amount sufficient to bring the ends up of the optical fibers together with near null pressure.

Figure 8:
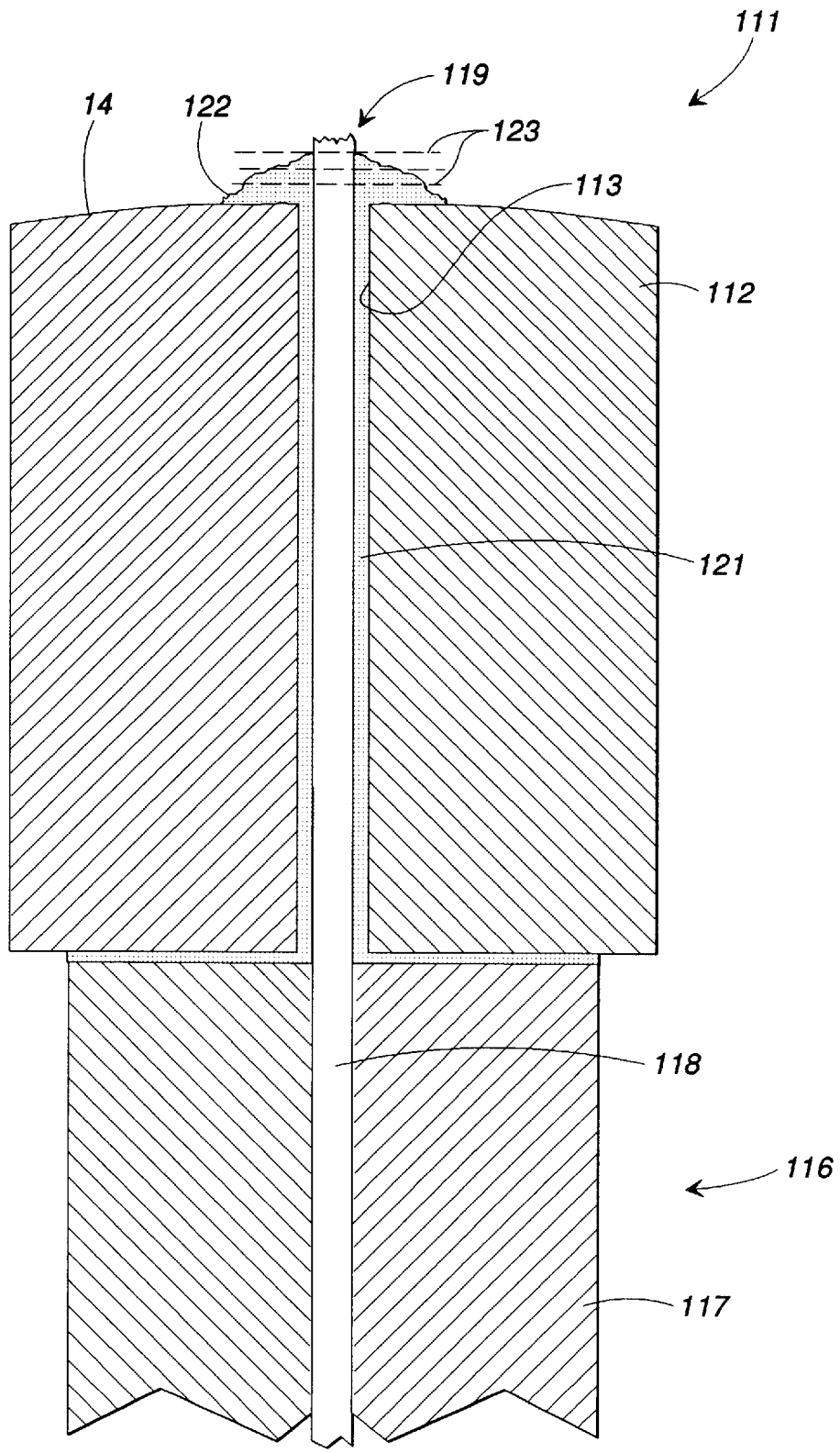
FIG. 8 is a dimensionally exaggerated cross-sectional view illustrating an optical fiber secured with epoxy in a ferrule before the grinding and polishing of the ferrule end.
Figure 9A:
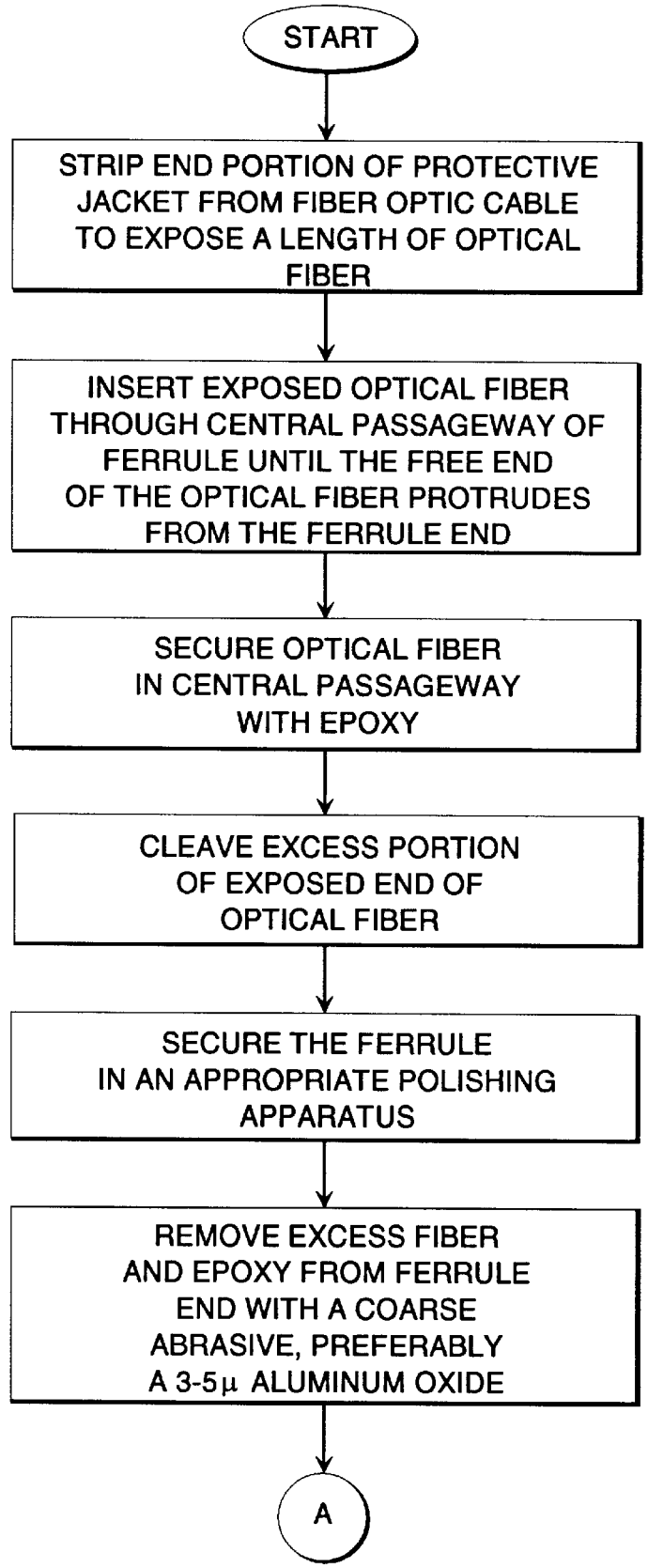
FIGS. 9a and 9b show a functional flow chart illustrating the various grinding and polishing steps of the method of invention.
Figure 9B:
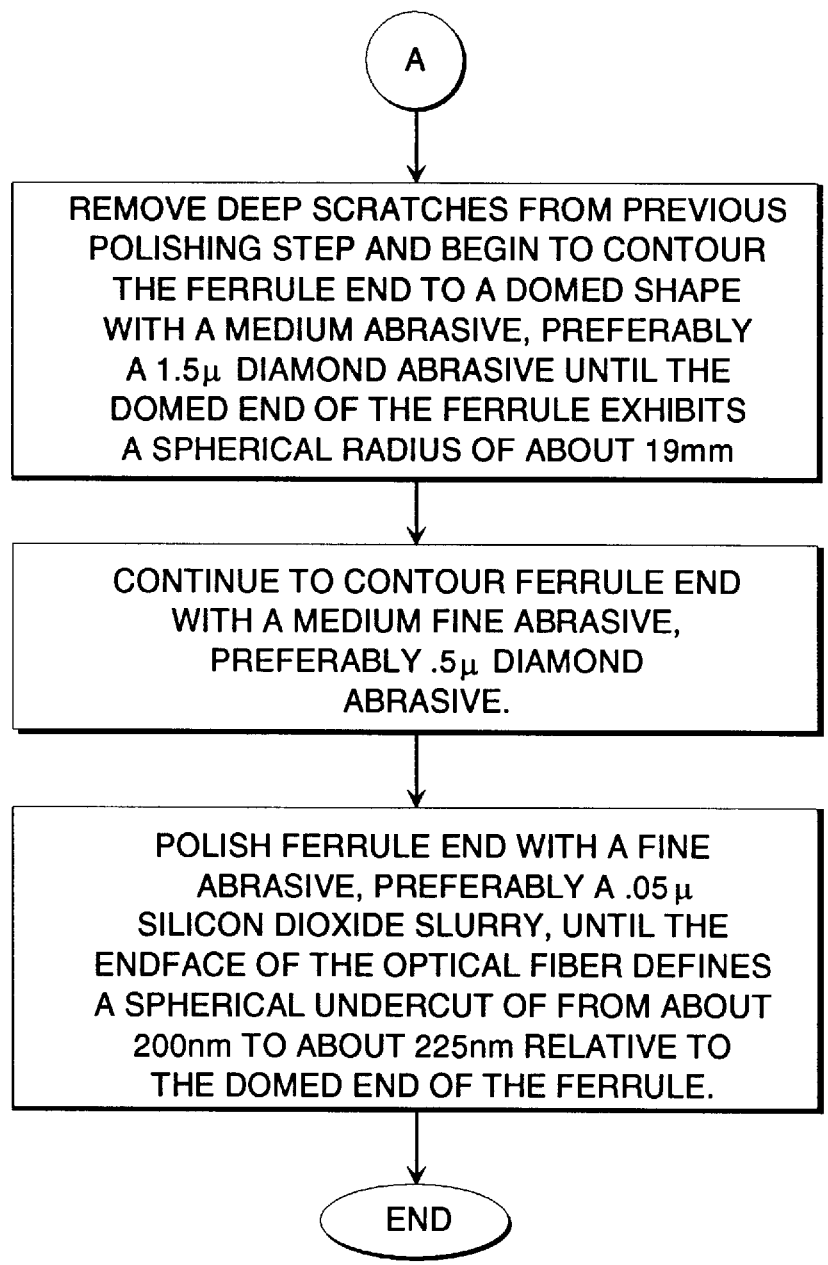

FIGS. 8 and 9 illustrate and flow chart a method of fabricating a fiber optic cable connector that embodies principals of the present invention in a preferred form. More specifically, these figures illustrate a method of configuring and finishing the end of a ferrule assembly for use in a fiber optic connector that exhibits improved return loss performance. It should be noted that, in FIG. 8, the relative dimensions of the various elements are not drawn to scale and, in some instances, are exaggerated in order to illustrate the elements and steps of this invention more clearly.

FIG. 8 illustrates the components of a ferrule assembly 111 upon which the method of this invention is carried out. The ferrule assembly 111 comprises a cylindrical ceramic ferrule 112. In the preferred embodiment, the ferrule 112 is formed from zirconia; however, other ceramic materials might also be used. The ferrule 112 has a central longitudinally or axially extending passageway 113 and a ferrule end 114.

A fiber optic cable 116 has a protective jacket 117 that surrounds and protects a central optical fiber 118. When fabricating a ferrule assembly according to the present invention, the end portion of the protective jacket 117 is stripped from the end of the fiber optic cable 116 to expose a length of the optical fiber 118. The exposed length of optical fiber 118 is then inserted through the central passageway 113 of the ferrule until the free end 119 of the optical fiber protrudes from the ferrule end 114. The optical fiber 118 is secured and held in place within the passageway 113 by means of an appropriate epoxy 121, which is injected into the passageway by means known in the prior art. Usually, the epoxy injection process leaves some excess epoxy 122 on the face 114 of the ferrule 112 surrounding the protruding end 119 of the optical fiber 118.

With the optical fiber 118 securely held in place within the passageway 113 by the epoxy 121, the protruding end 119 of the optical fiber is cleaved such as along lines 123 with an appropriate mechanical cleaver or laser. Once the excess optical fiber is cleaved, the end of the ferrule assembly is prepared for the grinding and polishing process that creates the unique configuration of the ferrule end as disclosed in the present application. As outlined in the flow chart of FIG. 9, the previously prepared ferrule assembly 111 is secured in an appropriate polishing apparatus such as, for example, the polishing apparatus shown in U.S. Pat. No. 5,185,966 of Mock, Jr., et al. and assigned to AT&T Bell Laboratories. In the polishing apparatus disclosed in this patent, connectors having protruding ferrules 111 are secured to the ends of respective arms that are appropriately controlled to hold the ferrule ends against a moving polishing surface such as a polishing disc. The ends of the ferrules are thereby ground and polished in successive polishing steps with such a machine. Polishing devices with other and different constructions may also be used and the apparatus shown in U.S. Pat. No. 5,185,966 is referenced as exemplary because it is commonly used within the industry.

With the ferrules appropriately secured in a polishing apparatus, the excess fiber and epoxy are first removed from the ferrule ends with a coarse abrasive on the polishing surface. Preferably, a 3 to 5 micron aluminum oxide coated abrasive is used in this first polishing step of the process. However, other types and grades or grit sizes of abrasives might also be used as long as they are sufficient to remove the excess fiber and epoxy.

In the next polishing step of the process, the polishing medium is changed to a medium abrasive and polishing continues in order to remove deep scratches from the previous polishing step and to begin to contour the ferrule end to a domed shape. In practice, it has been found preferable that a 1.5 micron diamond coated abrasive is preferable in this polishing step, although other abrasives and grit sizes might be applied. At the end of this second polishing step, deep scratches and fractures are removed and the ferrule end takes on a domed shape approximating the desired final domed shape. In practice, a desired spherical radius of the dome shape of the ferrule end is achieved by applying a backing of predetermined appropriate resiliency behind the coated abrasive used in the polishing step. In the preferred embodiment, the polishing time and backing surface are selected to ensure that the finished ferrule end exhibits a spherical radius of about 19 mm. However, ferrule ends with other spherical radii might also be produced by selecting the appropriate backing material and abrasive.

In the next polishing step of the process, the ferrule end is further contoured to its final domed shape with a medium-fine abrasive, preferably a 0.5 micron diamond coated abrasive to successively reduce the scratch size to a point where only fine scratches remain.

Once the end of the ferrule assembly has been ground and polished through the previous steps to exhibit a domed shape of a preferred spherical radius, the final polishing step is carried out. In this step, the ferrule end is polished with a fine abrasive, preferably a 0.05 micron silicon dioxide slurry, until the endface of the optical fiber defines both a predetermined spherical undercut and a predetermined planar undercut with respect to the domed ferrule end. In the preferred embodiment with a 19 mm spherical radius domed ferrule end, a spherical undercut of from about 200 nm to about 225 nm is preferred. This polishing step is radically different from the final polishing step of prior art methods, which continued only until the spherical undercut is about 50 nm so that the endface of the optical fiber defined a planar protrusion with respect to the ferrule end. That is, in the prior art, the final polishing step was stopped when the endface of the optical fiber protruded from the rim of the passageway in which it was secured. In the present invention, the final polishing step is carried out significantly longer until the relatively softer glass material of the optical fiber is abraded to exhibit a planar undercut; that is, until it is recessed within the central passageway of the ferrule. It has also been found that such a final processing step produces the desired larger zone of decreased density (reference numeral 71 in FIG. 4) that has been found to enhance the performance of the fiber optic connectors of this invention. In practice, using a silicon dioxide slurry of 0.05 micron granularity with a zirconia ferrule, the final polishing step requires a polishing time of about 4 minutes, 12 seconds as opposed to a much shorter time in prior art methods. However, this time is subject to change depending upon the polishing medium and ferrule material with the important constraint being that the polishing step is stopped when the endface of the optical fiber exhibits a predetermined spherical undercut and a predetermined planar undercut with respect to the end of the ferrule.

The invention has been described herein in terms of preferred embodiments. It will be obvious to those of skill in the art, however, that various additions, deletions and modifications might well be made to the illustrated embodiments without departing from the spirit and scope of the invention as set forth in the claims.

We claim:

1. A method of fabricating a ceramic ferrule assembly for use in a fiber optic cable connector having improved return loss performance, said method comprising the steps of:

(a) providing a ferrule having a central passageway and an end;

(b) stripping the end portion of a fiber optic cable to expose a length of the optical fiber encased therein;

(c) securing the length of optical fiber within the central passageway of the ferrule with the free end of the optical fiber protruding beyond the end of the ferrule;

(d) grinding the end of the ferrule with a relatively coarse abrasive to remove excess protruding optical fiber from the end of the ferrule;

(e) polishing the end of the ferrule with a relatively less coarse medium abrasive to remove scratches and fractures left in step (d) and to begin to contour the ferrule end to a domed shape having a predetermined spherical radius;

(f) polishing the end of the ferrule with a relatively less coarse medium fine abrasive to remove scratches and fractures left in step (e); and (g) polishing the end of the ferrule with a relatively fine abrasive for a period of time sufficient to cause the endface of the optical fiber to exhibit a predetermined spherical undercut and a predetermined planar undercut relative to the dome shaped end of the ferrule.

2. The method of claim 1 and where in step (a) the ferrule is substantially cylindrical and the passageway extends along the axis of the ferrule.

3. The method of claim 2 and wherein the ferrule is formed of zirconia.

4. The method of claim 1 and wherein step (c) comprises inserting the length of optical fiber through the passageway and injecting an epoxy into the passageway to secure and hold the optical fiber within the passageway.

5. The method of claim 1 and where in step (d) the relatively coarse abrasive comprises an aluminum oxide coated abrasive.

6. The method of claim 5 and wherein the aluminum oxide abrasive has a granularity of from about 3 microns to about 5 microns.

7. The method of claim 5 and where in step (e) the relatively less dense medium abrasive comprises a first diamond coated abrasive.

8. The method of claim 7 and wherein the first diamond coated abrasive has a granularity of about 1.5 microns.

9. The method of claim 7 and where in step (f) the relatively less dense medium fine abrasive comprises a second diamond coated abrasive.

10. The method of claim 9 and wherein the second diamond coated abrasive has a granularity of about 0.5 micron.

11. The method of claim 9 and where in step (g) the relatively fine abrasive comprises a silicon dioxide slurry.

12. The method of claim 11 and wherein the silicon dioxide slurry has a granularity of about 0.05 microns.

13. The method of claim 11 and where in step (g) the period of time is also sufficient to form a region of decreased density in the optical fiber extending a predetermined distance into the fiber from the endface thereof.

14. The method of claim 13 and wherein the predetermined distance is about 20 nanometers.

15. The method of claim 1, wherein the predetermined planar undercut is defined as a distance of the endface of the optical fiber from a lip of the end of the ferrule when the endface of the optical fiber is recessed relative to the dome shaped end of the ferrule.

16. A method of configuring and finishing an end of a ferrule having a central passageway within which an end portion of an optical fiber is secured with an endface of the fiber exposed at the end of the ferrule, said method comprising the steps of polishing the end of the ferrule with successively finer polishing media until the end of the ferrule takes on a dome shape of predetermined spherical radius and the endface of the optical fiber exhibits both a spherical undercut and a planar undercut with respect to the domed end of the ferrule.

17. A method of configuring and finishing the end of a ferrule as claimed in claim 16 and wherein the predetermined spherical radius is between about 18 and about 20 millimeters.

18. A method of configuring and finishing the end of a ferrule as claimed in claim 17 and wherein the predetermined spherical radius is about 19 millimeters.

19. A method of configuring and finishing the end of a ferrule as claimed in claim 17 and wherein said spherical undercut is between about 200 nanometers and about 225 nanometers.

20. A method of configuring and finishing the end of a ferrule as claimed in claim 19 and wherein said spherical undercut is about 212 nanometers.

21. A method of configuring and finishing the end of a ferrule as claimed in claim 16 and wherein the end of the ferrule is polished until the end of the ferrule takes on a dome shape of predetermined spherical radius, the endface of the optical fiber exhibits a spherical undercut and a planar undercut relative to the end of the ferrule, and the end of the optical fiber has a zone of reduced density extending a predetermined distance into the fiber from the endface thereof.

22. A method of configuring and finishing the end of a ferrule as claimed in claim 21 and wherein the predetermined distance is between about 18 nanometers and about 22 nanometers.

23. A method of configuring and finishing the end of a ferrule as claimed in claim 22 and wherein the predetermined distance is about 20 nanometers.

24. The method of claim 16, wherein the planar undercut is defined as a distance of the endface of the optical fiber from a lip of the end of the ferrule when the endface of the optical fiber is recessed relative to the end of the ferrule.

* * * * *